J. H. STERNBERGH.
Dies for Making Nuts.

No. 154,424.  Patented Aug. 25, 1874.

UNITED STATES PATENT OFFICE.

JAMES HERVEY STERNBERGH, OF READING, PENNSYLVANIA.

IMPROVEMENT IN DIES FOR MAKING NUTS.

Specification forming part of Letters Patent No. 154,424, dated August 25, 1874; application filed June 13, 1874.

*To all whom it may concern:*

Be it known that I, JAMES H. STERNBERGH, of the city of Reading, in the State of Pennsylvania, have invented new and Improved Dies for Making Nuts; and I do hereby declare that the following is a full, clear, and exact description thereof, reference being had to the accompanying drawing forming a part of this specification, in which—

Figure 1:
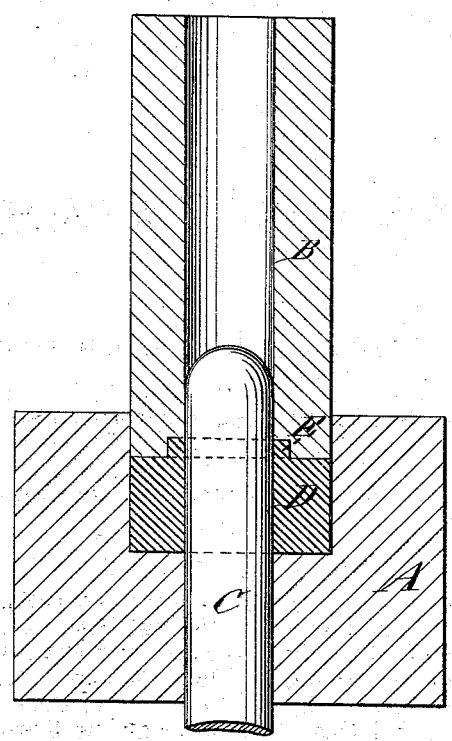
Figure 2:
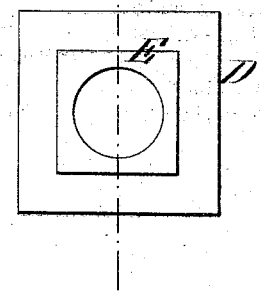

Figure 1 is a sectional elevation, Fig. 2 a plan view, of nut.

The invention will first be fully described, and then pointed out in the claim.

A represents a centrally-perforated female die, in whose cavity the piece of metal is placed, in order to be compressed into shape. B is a centrally-perforated male die, made to fit the cavity A, their perforations registering, so that the holing-punch C may pass freely through both. I make the nut with an angle-sided projection, E, on the bottom, so as to lock the nut to the washer which will be used with it. In order to accomplish this, I make the male die E with an angular internal cavity, corresponding to the form of projection E.

Having thus described my invention, what I claim is—

In nut-making machines, a compressing crowner-die, B, having an angular recess, E, in the end, and a central perforation, as and for the purpose specified.

JAMES HERVEY STERNBERGH.

Witnesses:
    JAMES LORD,
    THOS. DARLINGTON, Jr.